Jan. 23, 1951 G. J. WHITE 2,539,340
DISTRIBUTOR
Filed Jan. 11, 1946 2 Sheets-Sheet 1

Inventor
Gilbert John White
By Draser, Myers & Manley
Att'ys

Jan. 23, 1951  G. J. WHITE  2,539,340
DISTRIBUTOR
Filed Jan. 11, 1946  2 Sheets-Sheet 2
Fig. 1.<sup>A</sup>
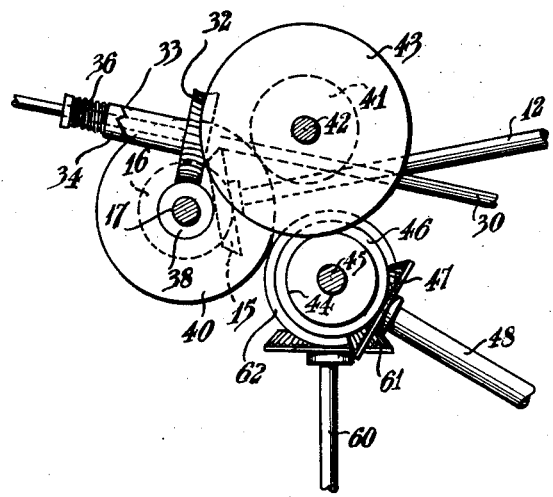
Fig. 2.<sup>A</sup>
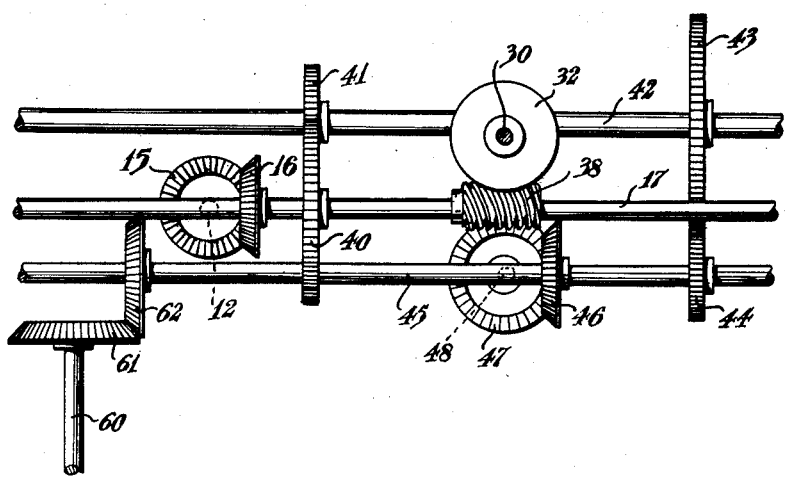
Inventor:
Gilbert John White
by
Fraser, Myers & Manley
attorneys Patented Jan. 23, 1951

2,539,340

UNITED STATES PATENT OFFICE 2,539,340

DISTRIBUTOR

Gilbert John White, Tavistock, Devon, England

Application January 11, 1946, Serial No. 640,560
In Great Britain February 1, 1945

5 Claims. (Cl. 275—4)

This invention relates to apparatus for unloading or discharging solid materials from a vehicle so as to distribute them over the ground and has special application to the discharge and distribution of fertilisers from farm vehicles but is also applicable to many other purposes, for example the discharge and distribution of road stone, gravel, sea sand, agricultural lime, etc.

Apparatus according to the present invention for distributing solid materials from a container forming part of a vehicle comprises a rotatable feed screw suspended by cables or the like over the material in said container and adapted by operation of the cables to be raised or lowered therein, means for rotating said feed screw, means for raising and lowering said feed mechanism so that it engages the top of the material in said container and feeds it towards discharge apertures therein, and means for controlling the rate of lowering of said feed screw in accordance with the movement of the vehicle so as to regulate the rate at which the material is discharged and distributed from said container. More than one of such feed screws may be mounted side by side for raising and lowering movement relative to said container. The container may be open at the discharge end or the floor at that end may be suitably apertured and the feed screw shaft or shafts may be pivotally supported in the container so that the feed screw or screws may be raised to a substantially vertical position to facilitate the loading of the container. The floor of the container may be shaped so as to be completely swept by the feed screw or screws when in the lowest position thereof, thus ensuring the emptying of the container so far as is practicable.

Each feed screw may be arranged to feed a mechanical spreader also carried on the vehicle, or the vehicle may be provided with a tail board having pegs or projections to break up any lumps or clots of material as it passes down the tail board between the pegs or projections.

The mechanical spreaders, if provided, may take the form of rotating discs or spinners mounted vertically beneath the container. The operation of these rotating discs is to evenly distribute the solid material over a specific area for which purposes the aforementioned discs or spinners may be of vaned or similar construction.

The movement for operating such mechanical spreaders may be transmitted either by independent motor drive mounted on the vehicle or directly from the main driving shaft or the axle of the vehicle chassis, the spreaders thus being driven by the action of the road wheels, or in another manner direct from the tail power unit of a tractor. The drive from either of the aforementioned power sources may be transmitted to the rotating discs by the medium of bevel gears or chains or belts and shafting. In like manner and with the necessary reduction in speeds the feed screws in the container may also be driven. A winch for raising and lowering the aforementioned feed screws is adapted to be selectively driven by hand or from the vehicle road wheels. By this means the rotating discs, the feed screws and the lowering mechanism for the feed screws, may now operate at determined speeds and integral with one another. The whole of the aforementioned driving mechanism may be housed at the rear of the container in a suitable box. Provision is also made that by means of pawls or levers or clutches, the drive may be discontinued on either or all of the units, namely, the rotating spreaders, the feed screws and the mechanism for raising and lowering the feed screws, when either or all of the aforementioned are not required to operate, as when moving the vehicle from one location to another.

When the aforementioned box is used to house the gearing or like driving mechanism, the rotating spreaders, the feed mechanism shafting and the hand winch for raising and lowering the feed screws, may be attached by a suitable method to the said box. Alternatively these units may be attached directly to the container or to the vehicle chassis.

To control the area of spreading of the solid materials ejected by the rotating spreaders, a shroud may be constructed in the form of an ellipse around the sides and to the rear of the rotating spreaders. This shroud may be conveniently attached to the container or to the vehicle chassis at the correct height from the ground and extending to a predetermined height above the level of the rotating spreaders. For convenience in entering or leaving a gateway or when proceeding along a highway the aforementioned shroud may be so constructed as to enable the sides of the shroud to fold upwards or backwards over or alongside the container thus reducing the overall width of the apparatus.

Referring to the drawings filed herewith,

Fig. 1A is a similar elevation, on an enlarged scale, of a detail of the apparatus shown in Fig. 1.

Fig. 2A is a view, similar to that of Fig. 2, of the detail shown in Fig. 1A.

Figure 1:
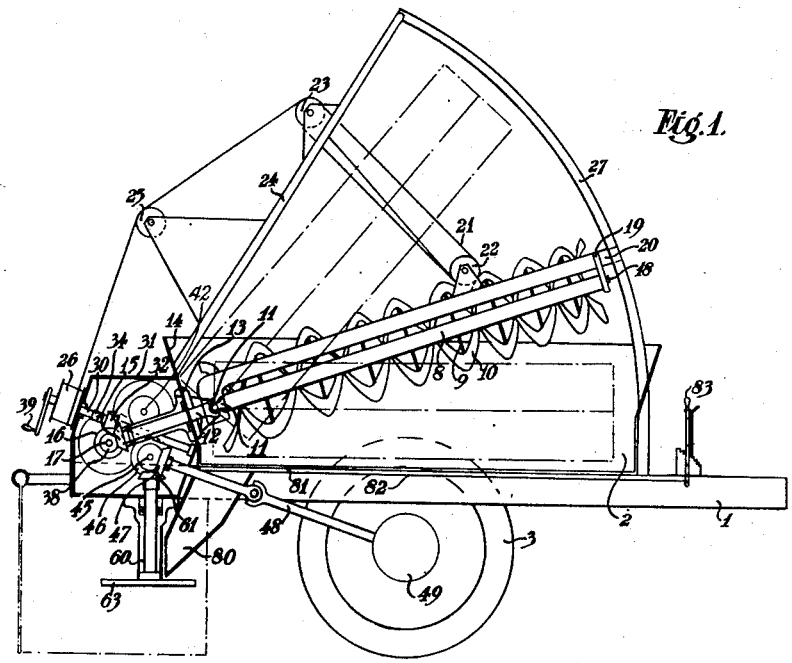
Fig. 1 is a diagrammatic longitudinal elevation of one form of mobile distributing apparatus made according to the present invention.

The form of apparatus about to be described is designed for use in distributing agricultural lime, sea sand or artificial fertilizer. It comprises a two-wheel vehicle constructed as a trailer adapted to be drawn by a farm tractor. On the chassis 1 of the vehicle is mounted an open-top container or hopper 2, supported on a single pair of road wheels 3.

The discharging mechanism comprises two longitudinally arranged feed screws of equal pitch but reverse sense formed by tubular shafts 8 on which are mounted arms 9 carrying helical blades 10 formed of sections welded together.

At the driven end each tubular shaft carries one member of a universal joint 11, the complementary member of which is carried on a short shaft 12 journalled in bearings 13 mounted on the rear end 14 of the container 2. A bevel gear 15 is secured to the other end of each of the shafts 12 which engage bevel gears 16 provided on a cross shaft 17. The other end of each of the tubular shafts 8 is rotatably mounted on a stud 18 mounted in a plate 19 carried by one end of an arm 20 of wood, the other end of which is pivotally connected to a bracket on the rear end 14 of the container, the axis of the pivot passing through the effective centers of the universal joints. A supporting cable 21 passes over pulleys of three-sheave pulley block 22 carried on the pivoted arm 20 to the hook of a three-sheave pulley block 23 carried on the superstructure 24, and from there over the pulley 25, also carried on the superstructure 24, to the winch drum 26 at the rear of the chassis behind the end 14. The free rear end of the pivoted arm 20 is guided in an arcuate tubular member 27 of metal. The pulley blocks 22 and 23 are movably mounted on the arm 20 and superstructure 24 respectively so that the rate of lowering of the arm 20 may be varied by altering the distance of these pulley blocks from the pivot of the arm 20.

The winch drum 26 is carried on a shaft 30 journalled in a housing or gear box 31. The shaft 30 carries a worm wheel 32 of a worm reduction gear, free to rotate thereon and having ratchet teeth 33 (Fig. 1A) adapted to be engaged by corresponding teeth on a dog member 34 slidably keyed to the shaft 30 and urged by a spring 36 into engagement with the teeth 33. The worm wheel 32 is meshed with a worm 38 keyed to the cross shaft 17 the bearings for which are also provided on the housing 31. On the end of the winch shaft 30 is a crank handle 39 for manual operation. The winch drum 26 may be tapered to provide a quicker rate of payout for the cable 21 at the start of the payout than later on. The cross shaft 17 carries a pinion 40 in mesh with a pinion 41 on a second cross shaft 42 which in turn carries a pinion 43 engaging a pinion 44 on a third cross shaft 45 located behind the cross shaft 42, both last-mentioned cross shafts being supported in bearings carried on the housing 31.

The cross shaft 45 is in turn driven by bevel gears 46, 47, from a propeller shaft 48 driven from the road wheels 3 through a conventional form of differential gear indicated diagrammatically at 49.

Mounted in the floor of the housing 31 at each side are bearings for short vertical shafts 60 carrying at one end bevel gears 61 engaging bevel gears 62 on the cross shaft 45 and at the other end disc spreaders 63.

Pivotally mounted at each side of the chassis 1 is a tubular metal arm 64 carrying at its free end a shroud 65 of calico, canvas or other suitable material the purpose of which is to limit the area of distribution of the solid materials thrown against the shroud by the disc spreaders 63. The arms 64 are supported from the superstructure by chains 66 and are adapted to be raised to a vertical position shown dotted in Fig. 2 when not required.

Figure 2:
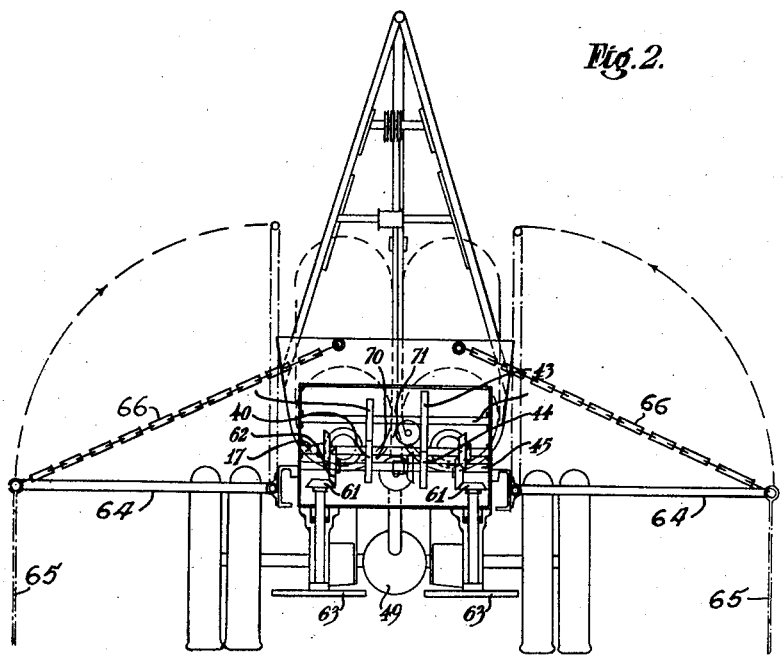
Fig. 2 is a diagrammatic end view of the apparatus shown in Fig. 1.

The floor 70 of the container 2 shown dotted in Fig. 2 is shaped as two parallel troughs with a ridge 71 between so that material in the container must fall into the trough and be acted on by one or other of the feed screws.

Dog clutch mechanism, not shown, would be incorporated in the propeller shaft 48 for disengaging the drive from the road wheels when the vehicle is being moved to or from the place where it is to be used.

The end 14 of the container adjacent the housing 31 is closed. Vertical chutes 80 are provided leading from two apertures in the floor 70 of the container 2. The said apertures are opened or closed by sliding doors 81 actuated by connecting rods 82 from levers 83. The chutes 80 are adapted to discharge onto the disc spreaders 63.

The feed screws are in operation rotated in a direction to urge the contents of the container towards the chutes.

In operation, to fill the container a clutch lever (not shown) is operated to slide the dog member 34 against pressure of the springs 36, thus disengaging the dogs 33, 34 and the crank handle 39 is turned to raise the feed screws 10 to the highest position (shown in dotted lines in Fig. 1). The container 2 is then ready to be filled. After filling the container, the crank handle 39 is turned in the opposite direction and the feed screws 10 are lowered into contact with the material in the container 2. With the dog clutch mechanism (not shown) in the main drive disengaged, the vehicle is thus taken to the site where this dog clutch mechanism is engaged and the levers 83 are operated to open the apertures in the floor 70 to the desired amount.

As soon as the vehicle is moved the feed screws 10 will be driven from the road wheels 3 through the gearing 49, 48, 47, 46, 45, 43, 42, 41, 40, 17, 16, 15, 12 so that material passes down the chutes 80 on to the disc spreaders 63 which are also driven from the road wheels 3 through the gearing 46, 45, 62, 61, 60 and which spread the material by centrifugal action. The dogs 33, 34 being now engaged, the road wheels 3 drive the drum 26 through the gearing 40, 17, 38, 32, 30 to pay out the cable 21, whereby the feed screws 10 are automatically lowered to remain in contact with the material in the container 2 as it discharges through the chutes 80.

Although spreading means have been disclosed herein as rotary disc spreaders, it should be understood that the spreading means, as a part of a combination, may be of any type suitable for yielding the spreading or distribution of the material over the ground. The present invention obviously may be varied in this and other respects without departing from the invention as defined in the following claims.

I claim:

1. Solid material distributing apparatus comprising in combination a vehicle having a supporting wheel for supporting the vehicle for movement over a ground surface, a material-holding container forming part of said vehicle and having a material-discharge aperture toward a discharge end of said container, a rotatable feed screw in said container, driving means for rotating said feed screw, pivotal bearing means carrying the ends of the screw and pivotally associated with the container to support the screw, with its axis extending substantially from the discharge end of the container to the opposite end thereof, for bodily pivotal movement of the screw between a raised position permitting material to be loaded into the container and a lowered position adjacent to the bottom of the container in each of which positions and all intervening positions the discharge end of the screw is above and in position to move adjacent material toward said discharge aperture, a supporting structure carried by said vehicle and having a portion disposed above said feed screw, a suspension cable connected at its one end to said feed screw and associated with said supporting structure portion for suspending the feed screw therefrom and being operable for pivotally raising and lowering the feed screw, a movable cable-anchorage element, to which the other end of the cable is connected, for taking in said cable to raise the feed screw to its said raised position and for paying out said cable to lower the feed screw under gravity into engagement with the top of a mass of material in the container so as to move material off the top of the mass and feed it continuously toward said discharge aperture and to remain in such engagement with the top of said mass as the level thereof decreases, and transmission means coactively disposed between the said supporting wheel and said anchorage element and adapted to limit the movement of the latter in the direction of paying out of said cable, and the consequent lowering of the feed screw, to a rate directly proportionate to the movement of the vehicle over the ground.

2. Solid material distributing apparatus comprising in combination a vehicle having a supporting wheel for supporting the vehicle for movement over a ground surface, a material-holding container forming part of said vehicle and having a material-discharge aperture toward a discharge end of said container, a rotatable shaft disposed above said discharge aperture in said container, with its axis extending in line with the ends of the container, driving means for rotating said shaft, bearing means carrying the shaft and movably associated with the container to support the shaft for bodily movement thereof upwardly and downwardly, at least one helical blade secured to and extending about said shaft to constitute a feed screw therewith, said blade, throughout its length, being spaced from said shaft by a substantial distance, a supporting structure carried by said vehicle and having a portion disposed above said feed screw, a suspension cable connected at its one end to said feed screw and associated with said supporting structure portion for suspending the feed screw therefrom and being operable for raising and lowering the feed screw, a movable cable-anchorage element, movably associated with the container, to which element the other end of the cable is connected, for taking in said cable to raise the feed screw to a raised position enabling material to be loaded into the container underneath the feed screw and for paying out said cable to lower the feed screw under gravity into engagement with the top of a mass of material in the container so as to move material off the top of the mass and feed it continuously toward said discharge aperture and to remain in such engagement with the top of said mass as the level thereof decreases, and transmission means coactively disposed between the said supporting wheel and said anchorage element and adapted to limit the movement of the latter continuously in the direction of paying out of said cable, and the consequent lowering of the feed screw, to a rate directly proportionate to the movement of the vehicle over the ground.

3. Solid material distributing apparatus comprising in combination a vehicle having a supporting wheel for supporting the vehicle for movement over a ground surface, a material-holding container forming part of said vehicle and having side walls, end walls, a floor, ridges dividing said floor longitudinally of said container to constitute a plurality of troughs therein of approximately semi-circular cross-section, and a material-discharge aperture in each of said troughs toward a discharge end thereof, a plurality of rotatable feed screws each mounted in said container over one of said troughs, at least one arm rotatably supporting said feed screws, driving means for rotating said feed screws, pivotal mounting means associated with the container and carrying said arm with the latter's associated feed screws for bodily pivotal movement between raised positions permitting material to be loaded into the container underneath the feed screws and lowered positions in which the feed screws are adjacent to the bottoms of their related troughs, a supporting structure carried by said vehicle and having a portion disposed above said arm, a suspension cable connected at its one end to said arm and associated with said supporting structure portion for suspending the arm and its related feed screws therefrom and being operable for pivotally raising and lowering said arm, a movable cable-anchorage element, to which the other end of the cable is connected, for taking in said cable to raise the arm and its associated feed screws to their raised positions and for paying out said cable to lower the arm and feed screws under gravity to bring the latter into engagement with the tops of masses of material in said troughs so as to move material off the tops of the said masses and feed it continuously toward said discharge apertures and to remain in such engagement with the tops of said masses as the levels thereof decrease, and fixed-ratio transmission means coactively disposed between the said supporting wheel and said anchorage element and adapted to limit the movement of the latter in the direction of paying out of said cable, and the consequent lowering of the arm and feed screws, to a rate directly proportionate to the movement of the vehicle over the ground.

4. Solid material distributing apparatus comprising in combination a vehicle having a supporting wheel for supporting the vehicle for movement over a ground surface, a material-holding container forming part of said vehicle and having side walls, end walls, a floor, ridges dividing said floor longitudinally of said container to constitute a plurality of troughs therein of approximately semi-circular cross-section, and a material discharge aperture in each of said troughs toward a discharge end thereof, a plurality of rotatable shafts each mounted in said container over one of said troughs, at least one helical blade secured to and extending about each individual one of said shafts to constitute a feed screw therewith, said blade, throughout its length, being spaced from the associated one of said shafts by a substantial distance, at least one arm rotatably supporting said feed screw shafts, driving means for rotating said feed screw shafts and blades, pivotal mounting means associated with the container and carrying said arm with the latter's associated feed screws for bodily pivotal movement between raised positions permitting material to be loaded into the container underneath the feed screws and lowered positions in which the feed screws are adjacent to the bottoms of their related troughs, a supporting structure carried by said vehicle and having a portion disposed above said arm, a suspension cable connected at its one end to said arm and associated with said supporting structure portion for suspending the arm and its related feed screws therefrom and being operable for pivotally raising and lowering said arm, a movable cable-anchorage element, to which the other end of the cable is connected, for taking in said cable to raise the arm and its associated feed screws to their raised positions and for paying out said cable to lower the arm and feed screws under gravity to bring the latter into engagement with the tops of masses of material in the said troughs so as to move material off the tops of said masses and feed it continuously toward said discharge apertures and to remain in such engagement with the tops of said masses as the levels thereof decrease, and transmission means coactively disposed between the said supporting wheel and said anchorage element and adapted to limit the movement of the latter in the direction of paying out of said cable, and the consequent lowering of the arm and feed screws, to a rate directly proportionate to the movement of the vehicle over the ground.

5. Solid material distributing apparatus comprising in combination a supporting wheel for supporting the vehicle for movement over a ground surface, a material-holding container forming part of said vehicle and having a material discharge aperture toward a discharge end of said container, a rotatable feed screw in said container, driving means for rotating said feed screw, bearing means carrying the ends of the screw and movably associated with the container to support said screw for bodily movement thereof upwardly and downwardly, a supporting structure carried by said vehicle and having a portion disposed above said feed screw, a suspension cable connected at its one end to said feed screw and associated with said supporting structure portion for suspending the feed screw therefrom and being operable for raising and lowering the feed screw, a movable, cable-anchorage element to which the other end of the cable is connected for taking in said cable to raise the feed screw to a position enabling material to be loaded into the container underneath the feed screw and for paying out said cable to lower the feed screw under gravity into engagement with the top of a mass of material in the container so as to move material off the top of the mass and feed it continuously toward said discharge aperture and to remain in such engagement with the top of said mass as the level thereof decreases, and transmission means in driving association with the supporting wheel and coacting with said anchorage element to limit the movement of the latter continuously in the direction of paying out of said cable, and the consequent lowering of the feed screw, to a rate proportionate to the movement of the vehicle over the ground.

GILBERT JOHN WHITE.

REFERENCES CITED

The following references are of record in the file of this patent:

UNITED STATES PATENTS

| Number | Name | Date |
|---|---|---|
| 488,680 | Rix | Dec. 27, 1892 |
| 648,152 | Loessner | Apr. 24, 1900 |
| 1,000,004 | Huber | Aug. 8, 1911 |
| 1,180,988 | Elliott | Apr. 25, 1916 |
| 1,415,061 | Smith et al. | May 9, 1922 |
| 1,462,387 | Slade | July 17, 1923 |
| 1,668,516 | Litchfield et al. | May 1, 1928 |
| 1,944,847 | Satsky et al. | Jan. 23, 1934 |
| 2,185,415 | Miles | Jan. 2, 1940 |
| 2,296,909 | Dake | Sept. 29, 1942 |
| 2,298,332 | Applegate | Oct. 13, 1942 |
| 2,360,126 | Griffiths | Oct. 10, 1944 |
| 2,401,465 | Cwicig | June 4, 1946 |
| 2,410,996 | Patterson | Nov. 12, 1946 |